United States Patent
Sussmeier et al.

(10) Patent No.: US 7,474,073 B2
(45) Date of Patent: Jan. 6, 2009

(54) METHOD AND SYSTEM FOR MULTIPLE SERVO MOTOR CONTROL USING A SINGLE CONTROL LOOP

(75) Inventors: John W. Sussmeier, Cold Spring, NY (US); Arthur H. DePoi, Brookfield, CT (US); Gerald Leitz, New Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 137 days.

(21) Appl. No.: 11/601,496

(22) Filed: Nov. 17, 2006

(65) Prior Publication Data

US 2008/0116836 A1 May 22, 2008

(51) Int. Cl.
*G05B 11/32* (2006.01)
(52) U.S. Cl. .................................... 318/625; 318/432
(58) Field of Classification Search ................ 318/625, 318/601, 432, 434, 9, 3, 14, 602
See application file for complete search history.

(56) References Cited

U.S. PATENT DOCUMENTS 6,046,566 A * 4/2000 Sonoda et al. .............. 318/625
6,298,779 B1 * 10/2001 Gotanda et al. ........... 101/350.1
6,384,861 B1 * 5/2002 Lindsey ...................... 348/169

* cited by examiner

*Primary Examiner*—Rina I Duda
(74) *Attorney, Agent, or Firm*—Christopher H. Kirkman; Steven J. Shapiro; Angelo N. Chaclas

(57) ABSTRACT

The solution involves the use of two or more motors to drive a common mechanism. The single control loop includes a position sensing device coupled to only a first of the plurality of servo motors and generating a position signal. A signal comparator receives the position signal and compares the position signal with a predetermined desired position based on a desired motion profile. The difference from the actual position and the motion profile is output as a position error signal. A signal converter receives the position error signal and derives a conversion signal based on the error signal. The conversion signal is provided to a plurality of signal amplifiers, which in turn are coupled to the plurality of servo motors. The amplifiers provide power to the motors for driving the mechanical load.

15 Claims, 3 Drawing Sheets

METHOD AND SYSTEM FOR MULTIPLE SERVO MOTOR CONTROL USING A SINGLE CONTROL LOOP

TECHNICAL FIELD

The present invention relates to improved control of multiple servo motors that are coupled to a common mechanical load.

BACKGROUND OF THE INVENTION

Inserter machines, such as those produced by Pitney Bowes Inc. are used by organizations to produce large volumes of mail at very high speeds. These machines must be capable of handling sheets and collations of paper very quickly and precisely. In recent designs, it has been found that servo motors are well suited for executing the demanding and precise motion profiles needed for transporting paper in these systems.

Commonly, design requirements for output mechanical power or torque are increased to exceed the capability of the originally selected motor and drive. This forces the design engineer to consider one or more of the following options: reduction of mechanical loads, reduction of performance requirements, or use of a higher output motor and drive.

Very often, it is impractical to reduce the mechanical loads and/or unacceptable to decrease the performance requirements. This forces the design engineer to use a larger motor and drive from that was originally selected. This can result in higher system cost and can cause packaging problems due to issues associated with increased component size.

For mechanisms that require more output torque or power than less expensive ⅓ horsepower DC servo motor systems, AC servo motor systems are frequently considered as a practical option. However, the incremental price increase to implement an AC servo motor system can be disproportionably more than the additional output power or torque required of the mechanism and motion profile.

SUMMARY OF THE INVENTION

The invention involves the use of two motors to drive a single mechanical load. By doing this, a lower system cost might be achieved instead of using a larger one motor system solution. Unlike solutions that utilize multiple outer control loops to control multiple motors, this invention uses only one outer control loop. By use of this method, complex system instabilities associated with multiple control loops can be eliminated. Furthermore, the invention need not be limited to two motors systems as any number of motor systems may be added to drive a common mechanical load without compromising system stability or working against one another.

The single control loop includes a position sensing device coupled to a first of the plurality of servo motors and generating a position signal. A signal comparator receives the position signal and compares the position signal with a predetermined position based on a desired motion profile. The difference from the actual position and the motion profile is output as a position error signal.

A signal converter receives the position error signal and derives a conversion signal (analog or digital) based on the error signal. The analog gain signal is provided to a plurality of signal amplifiers, which in turn are coupled to the plurality of servo motors. The amplifiers provide power to the motors for driving the mechanical load.

Further details of the present invention are provided in the accompanying drawings, detailed description and claims.

DETAILED DESCRIPTION

Figure 1:
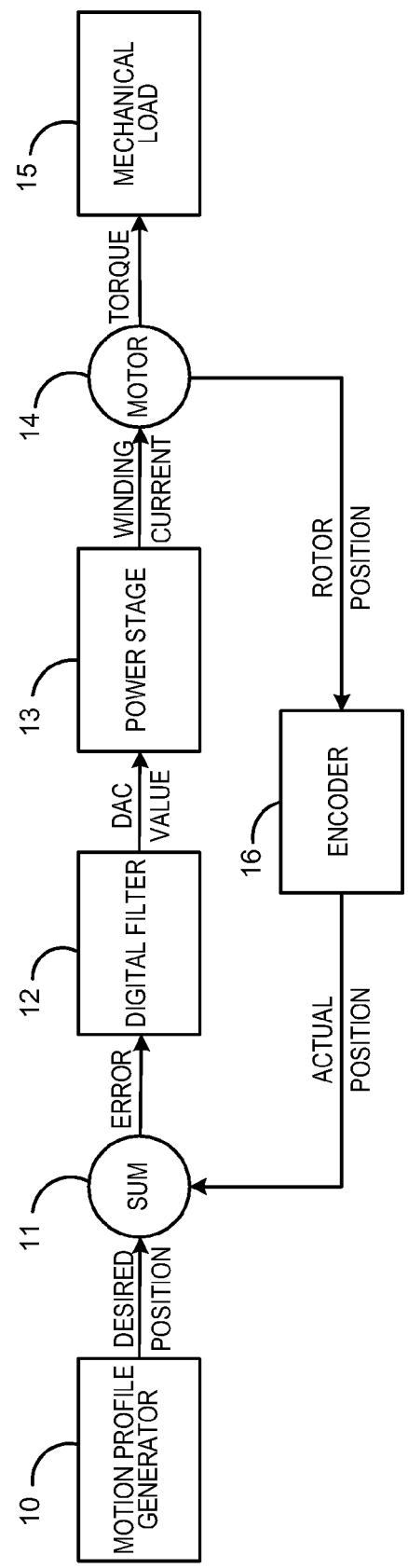
FIG. 1 is a block diagram that illustrates typical position control elements for a closed-loop servo motor system.

The use of position control systems as illustrated in FIG. 1 are well known in the motion control industry. At some periodic rate, a motion profile generator 10 injects a desired position into a summing junction 11, also referred to herein as a comparator. Actual position is subtracted from the desired position to provide a position error. This error is injected into a digital filter 12 that outputs a DAC (digital to analog converter) value. In the industry, the digital filter 12 is most commonly a known PID (Proportional, Integral, Derivative) filter but can be any suitable algorithm that converts position error into a DAC power stage 13 (also referred to as an amplifier or drive) value to a motor 14 that ultimately provides the desired quality of motion at the mechanical load 15.

The DAC value is scaled accordingly to match the inputs and outputs of the power stage or amplifier 13. For example, many commercially available amplifiers 13 use ±10 VDC as an acceptable analog input signal. The power stage 13 converts this input signal and outputs a winding current that is proportional to the input signal. With new components, the digital filter 12 may output a digital value whereby the power stage 13 can accept this digital value and accomplish the same as the analog version. Winding current is delivered to the motor 14 and is typically proportional to motor 14 output torque. This ultimately provides motion to the mechanism 15. An encoder 16 or other suitable feedback device located on the motor 14 or on the mechanism 15 provides the actual position back to the summing junction 11, completing the outer closed loop. (The control loop within the power stage 13 that regulates output current is commonly referred to as an inner loop.)

In an inserter machine application, this entire process typically updates at a period of 500 microseconds (or 2 KHz), ultimately providing the desired quality of motion at the mechanism 15. Quality of motion generally refers to one or more of the following metrics; position error, velocity overshoot and settling time. If the motor 15 and power stage 13 is not adequately sized, the desired quality of motion cannot be achieved and/or be sustained over periods of continuous operation.

Figure 2:
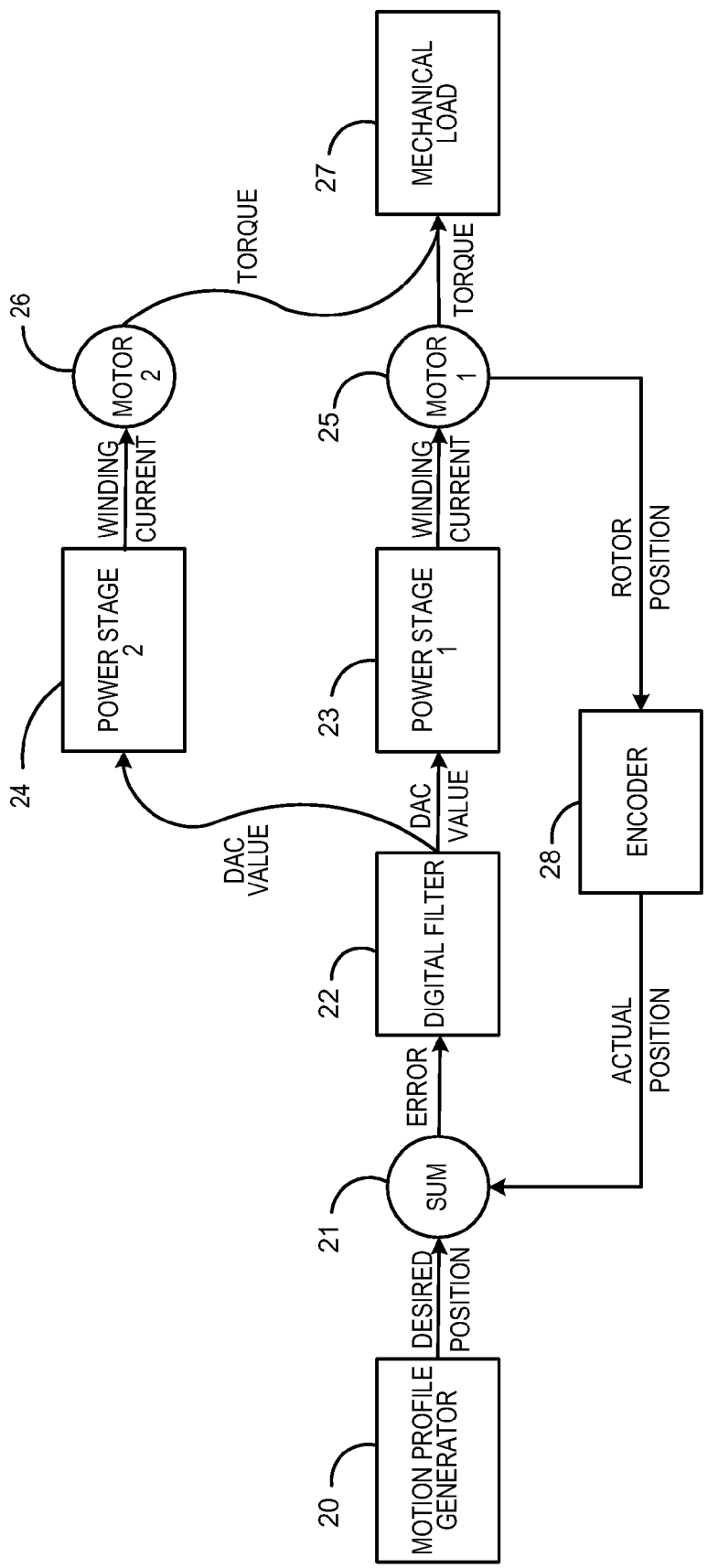
FIG. 2 is a block diagram that illustrates the position control elements for a two motor system.

FIG. 2 illustrates the position control elements for a two motor system. One motor 25 (Motor 1 or the main motor) uses a traditional servo control loop while the second motor 26 (Motor 2 or the helper motor) receives the same torque command as the main motor 25 at every servo update period. By sending the same DAC signal to a second power stage 24 that drives a second motor 26 that is also coupled to the mechanism 27, output torque can be effectively doubled.

A position sensing device 28 is coupled to one of the motors 25, 26 to provide feedback on the motor position. Preferably, the position sensing device is an encoder 28. Alternatively, the position sensing device 28 can be coupled to the mechanical load 27, the position of which will be a function of the motor 25.

The actual position is provided from the position sensing device 28 to a comparator 21 (or summing device). The comparator 21 compares the actual position with a motion profile provided from a motion profile generator 20. A motion profile is a predetermined sequence of positions and timing required for proper operation of the machinery. The difference found by comparator 21 is a position error signal that is provided to the digital filter 22.

The digital filter 22 must convert the position error signal to a signal suitable for controlling the motors 25, 26. The digital filter 22 can be tuned using conventional means once both motors 25, 26 are coupled to the load 27 and the control system is enabled. Since the two motors 25, 26 can provide double the torque over the one motor system, the gains within the digital filter 22 must be reduced accordingly to preserve servo system stability.

Figure 3:
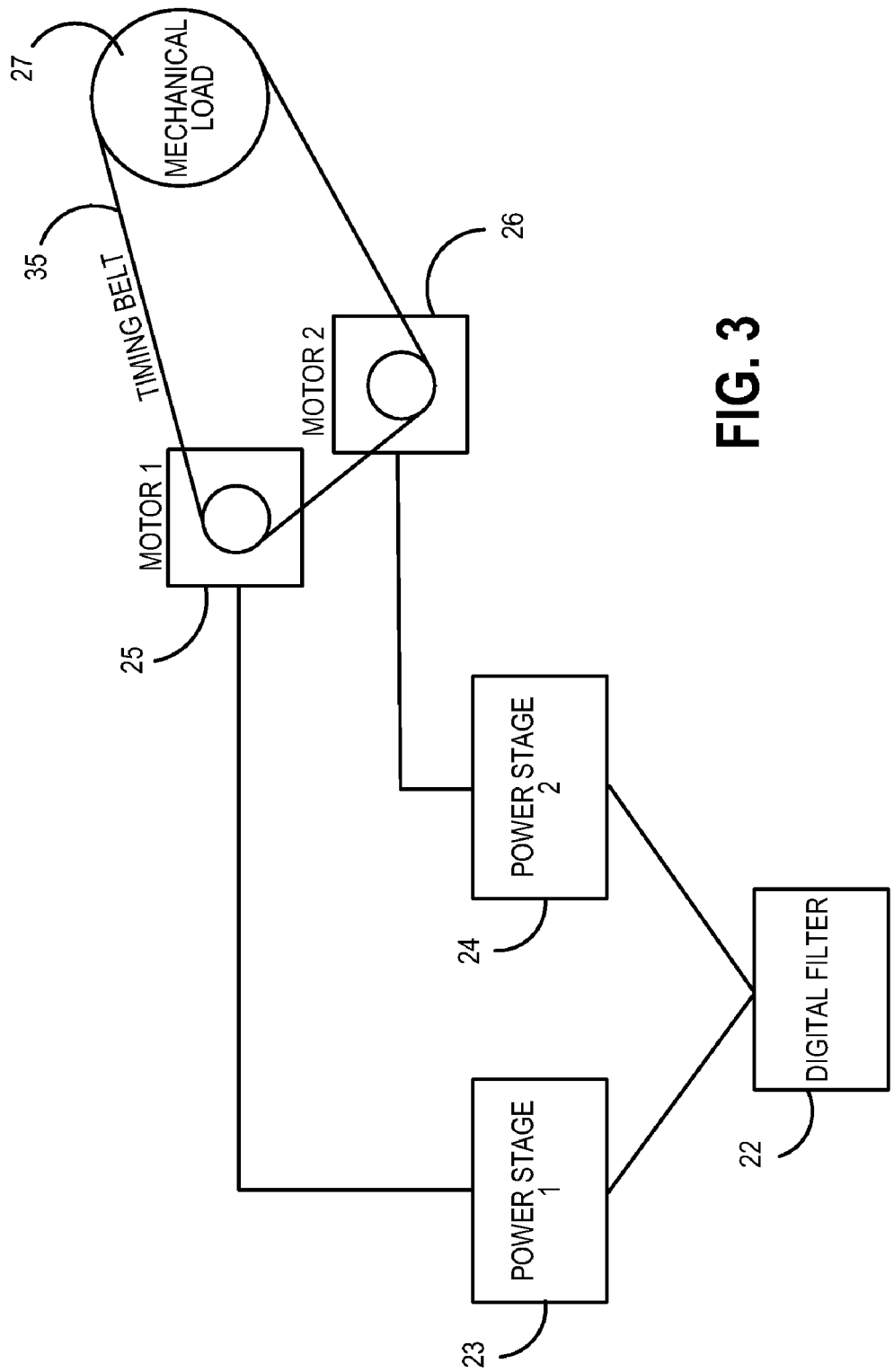
FIG. 3 is a diagrammatic representation of a typical mechanical implementation using a two motor system.

The mechanical coupling of the two motors 25, 26 can be accomplished in a number of ways including direct coupling, through separate timing belts or through a common timing belt 35 (FIG. 3) For those systems where the direction of motion for one motor is opposite of the other to achieve the same direction on the mechanism, the polarity of the DAC value can be inverted for the helper motor 26.

Unlike other solutions that utilize multiple outer control loops, i.e. those systems that use multiple feedback devices, to control multiple motors, this invention uses only one outer control loop. By use of this method, complex system instabilities associated with multiple control loops can be eliminated. Also since the polarity of the torque direction is always the same for both motor systems, this guarantees that the systems will never be working against one another, thereby minimizing motor heating and electrical power consumption. Furthermore, the invention need not be limited to two motors systems as any number of motor systems may be added to drive a common mechanical load without compromising system stability.

Although the invention has been described with respect to preferred embodiments thereof, it will be understood by those skilled in the art that the foregoing and various other changes, omissions and deviations in the form and detail thereof may be made without departing from the spirit and scope of this invention.

What is claimed is:

1. A method for controlling a plurality of servo motors using a single control loop, the method comprising:
   coupling the plurality of servo motors to a common mechanical load;
   sensing an actual position of a first of the plurality of servo motors;
   comparing the actual position with a predetermined desired position thereby deriving a position error signal;
   inputting the position error signal to a signal converter to derive a conversion signal;
   providing the conversion signal to a plurality of amplifiers, the plurality of amplifiers each being coupled to the plurality of servo motors, the amplifiers providing power to the motors for driving the mechanical load.

2. The method of claim 1 wherein the step of sensing the actual position is performed by detecting a rotary position of the first motor via an encoder.

3. The method of claim 1 wherein the signal converter is a tunable digital filter.

4. The method of claim 3 further comprising the step of tuning the digital filter based on performance of driving the mechanical load with the plurality of servo motors.

5. The method of claim 1 further including a step of determining the predetermined desired position based on a motion profile.

6. The method of claim 1 further including a step of transporting a series of sheets of paper driven as the mechanical load of the plurality of motors.

7. The method of claim 1 wherein the step of coupling the plurality of motors to the mechanical load is accomplished by winding a timing belt around the servo motors and the mechanical load.

8. The method of claim 1 wherein the step of sensing the actual position includes sensing a position of the mechanical load, and the position of the first motor is a function of the position of the mechanical load.

9. A system for driving a mechanical load with servo motors using a single control loop, the system comprising:
   a plurality of servo motors coupled to a common mechanical load;
   a position sensing device coupled to a first of the plurality of servo motors and generating a position signal for the first servo motor;
   a signal comparator receiving the position signal and arranged to compare the position signal with a predetermined desired position and thereby deriving a position error signal;
   a signal converter receiving the position error signal and deriving a conversion signal based on the error signal;
   a plurality of signal amplifiers receiving the conversion signal, the plurality of amplifiers each being coupled to the plurality of servo motors, the amplifiers providing power to the motors for driving the mechanical load.

10. The system of claim 9 wherein the position sensing device is an encoder coupled to a rotor of the first servo motor.

11. The system of claim 9 wherein the signal converter is a tunable digital filter.

12. The system of claim 9 further including a control system arranged to provide a motion profile from which the predetermined desired position based on the motion profile is provided to the signal comparator.

13. The system of claim 9 further comprising a paper transport system is coupled to and driven by the mechanical load of the plurality of motors, the transport driving a series of paper sheets.

14. The system of claim 9 wherein the plurality of motors is coupled to the mechanical load by winding a timing belt wound around the servo motors and the mechanical load.

15. The system of claim 9 wherein the position sensing device is coupled to the first motor via the mechanical load.

* * * * *